US009232507B2

(12) United States Patent
Takeda et al.

(10) Patent No.: US 9,232,507 B2
(45) Date of Patent: Jan. 5, 2016

(54) RADIO BASE STATION APPARATUS AND CONTROL INFORMATION DETECTION METHOD

(75) Inventors: Kazuaki Takeda, Tokyo (JP); Naoto Ookubo, Tokyo (JP); Tetsushi Abe, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 324 days.

(21) Appl. No.: 13/988,815

(22) PCT Filed: Oct. 3, 2011

(86) PCT No.: PCT/JP2011/072762
§ 371 (c)(1),
(2), (4) Date: Jul. 15, 2013

(87) PCT Pub. No.: WO2012/070312
PCT Pub. Date: May 31, 2012

(65) Prior Publication Data
US 2013/0286996 A1    Oct. 31, 2013

(30) Foreign Application Priority Data
Nov. 26, 2010  (JP) .................. 2010-264082

(51) Int. Cl.
*H04W 4/00*     (2009.01)
*H04W 72/04*    (2009.01)
(Continued)

(52) U.S. Cl.
CPC ......... *H04W 72/0406* (2013.01); *H04L 1/1692* (2013.01); *H04W 72/00* (2013.01); *H04W 76/048* (2013.01); *H04W 88/08* (2013.01)

(58) Field of Classification Search
None
See application file for complete search history.

(56) References Cited

U.S. PATENT DOCUMENTS

| 8,982,690 | B2 * | 3/2015 | Nakao et al. | 370/216 |
| 2009/0207793 | A1 * | 8/2009 | Shen et al. | 370/329 |

(Continued)

FOREIGN PATENT DOCUMENTS

| WO | 2010122783 A1 | 10/2010 |
| WO | 2010122808 A1 | 10/2010 |

OTHER PUBLICATIONS

International Search Report issued in PCT/JP2011/072762 mailed Nov. 1, 2011 (4 pages).

(Continued)

*Primary Examiner* — Phirin Sam
(74) *Attorney, Agent, or Firm* — Osha Liang LLP

(57) ABSTRACT

To efficiently detect feedback control information on downlink shared data channel signals transmitted with a plurality of base frequency blocks also in the case of performing radio communications with a system band comprised of a plurality of base frequency blocks, it is a feature to have detecting sections (208, 210) configured to detect a correlation value between an ACK/NACK signal received in uplink and each of ACK/NACK candidate replicas associated with ACK and NACK in response to a downlink shared data channel signal of a particular base frequency block assigned to the mobile terminal apparatus among a plurality of base frequency blocks or of each of a plurality of base frequency blocks, and an A/N·DTX determining section (211) configured to determine feedback control information on the downlink shared data channel signal of the particular base frequency block or of each of the plurality of base frequency blocks, based on the detected correlation value and a DTX determination threshold value.

9 Claims, 7 Drawing Sheets

(51) Int. Cl.
*H04L 1/16* (2006.01)
*H04W 76/04* (2009.01)
*H04W 88/08* (2009.01)
*H04W 72/00* (2009.01)

(56) References Cited

U.S. PATENT DOCUMENTS

| | | | |
|---|---|---|---|
| 2010/0034114 A1* | 2/2010 | Kim et al. | 370/252 |
| 2010/0173641 A1* | 7/2010 | Kim et al. | 455/450 |
| 2011/0176443 A1* | 7/2011 | Astely et al. | 370/252 |
| 2011/0243066 A1* | 10/2011 | Nayeb Nazar et al. | 370/328 |
| 2012/0026892 A1 | 2/2012 | Nakao et al. | |
| 2012/0089880 A1 | 4/2012 | Nakao et al. | |
| 2014/0177565 A1* | 6/2014 | Zeira et al. | 370/329 |
| 2014/0286233 A1* | 9/2014 | Chung et al. | 370/315 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Office Action issued in corresponding Japanese Application No. 2010-264082, mailed Aug. 6, 2013 (4 pages).

* cited by examiner

RADIO BASE STATION APPARATUS AND CONTROL INFORMATION DETECTION METHOD

TECHNICAL FIELD

The present invention relates to a radio base station apparatus and control information detection method in the next-generation mobile communication system.

BACKGROUND ART

In UMTS (Universal Mobile Telecommunications System) networks, for the purpose of improving spectral efficiency, peak data rates, etc., by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing spectral efficiency and peak data rates, reducing delay and the like, Long Term Evolution (LTE) has been studied (for example, see Non-patent Document 1). In LTE, as distinct from W-CDMA, as a multiple access scheme, the scheme based on OFDMA (Orthogonal Frequency Division Multiple Access) is used in downlink, and the scheme based on SC-FDMA (Single Carrier Frequency Division Multiple Access) is used in uplink.

As shown in FIG. 1, signals transmitted in uplink are mapped to appropriate radio resources, and are transmitted from a mobile terminal apparatus to a radio base station apparatus. In this case, user data (UE (User Equipment) #1, UE #2) is assigned to the uplink shared channel (PUSCH: Physical Uplink Shared CHannel). Meanwhile, control information is time-multiplexed with the PUSCH when the control information is transmitted concurrently with the user data, and when only the control information is transmitted, is assigned to the uplink control channel (PUCCH: Physical Uplink Control CHannel). The control information transmitted in uplink includes downlink quality information (CQI: Channel Quality Indicator), retransmission response signal (ACK/NACK) to the signal of the downlink shared data channel (PDSCH: Physical Downlink Shared CHannel), etc.

In the PUCCH, typically, different subframe configurations are adopted between the case of transmitting the CQI and the case of transmitting ACK/NACK (see FIGS. 2A and 2B). In the subframe configuration of the PUCCH, one slot (½ subframe) contains 7 SC-FDMA symbols. Further, one SC-FDMA symbol contains 12 information symbols (subcarriers). More specifically, as shown in FIG. 2A, in the subframe configuration (CQI format (PUCCH formats 2, 2a, 2b)) of the CQI, a reference signal (RS) is multiplexed into a second symbol (#2) and sixth symbol (#6), and the control information (CQI) is multiplexed into the other symbols (first symbol (#1), third symbol (#3) to fifth symbol (#5), seventh symbol (#7)) in a slot. Meanwhile, as shown in FIG. 2B, in the subframe configuration (ACK/NACK format (PUCCH formats 1, 1a, 1b)) of ACK/NACK, a reference signal is multiplexed into third symbol (#3) to fifth symbol (#5), and the control information (ACK/NACK) is multiplexed into the other symbols (first symbol (#1), second symbol (#2), sixth symbol (#6), seventh symbol (#7)) in a slot. In one subframe, the slot is repeated twice. Further, as shown in FIG. 1, the PUCCH is multiplexed into radio resources at opposite ends of the system band, and frequency hopping (Inter-slot FH) is applied between two slots having different frequency bands in one subframe.

CITATION LIST

Non-patent literature

[Non-patent literature 1] 3GPP, TR25.912 (V7.1.0), "Feasibility study for Evolved UTRA and UTRAN", September 2006

SUMMARY OF THE INVENTION

Technical Problem

In the 3G system (W-CDMA), a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further improving spectral efficiency, peak data rates, etc. a successor system to LTE has been studied (for example, also called "LTE Advanced" or "LTE enhancement" (hereinafter, referred to as LTE-A)).

In LTE-A systems, for the purpose of further improving spectral efficiency, peak throughput, etc. assignments of frequencies with wider bands than in LTE systems have been studied. Further, in LTE-A (for example, Rel. 10) systems, having Backward compatibility with LTE systems is one of requirements, and therefore, adopted is a configuration of a system band with a plurality of base frequency blocks (component carriers: CC) each having a bandwidth capable of being used in LTE systems. Therefore, in LTE-A systems, it is necessary to transmit feedback control information on downlink shared data channels (PDSCHs, hereinafter, referred to as "data channels" as appropriate) transmitted by a plurality of downlink CCs. In such detection of the feedback control information on data channels transmitted with a plurality of downlink CCs, it is required to efficiently perform detection from the viewpoint of reducing loads on the radio base station apparatus.

The present invention was made in view of such a respect, and it is an object of the invention to provide a radio base station apparatus and control information detection method for enabling efficient detection of feedback control information on downlink shared data channel signals transmitted with a plurality of base frequency blocks also in the case of performing radio communications with a system band comprised of a plurality of base frequency blocks.

Solution to Problem

A radio base station apparatus of the invention is a radio base station apparatus for performing radio communications with a system band comprised of a plurality of base frequency blocks, and is characterized by having a detecting section configured to detect a correlation value between an ACK/NACK signal received in uplink and each of ACK/NACK candidate replicas associated with ACK indicative of a state in which a mobile terminal apparatus receives a downlink shared data channel signal of a particular base frequency block assigned to the mobile terminal apparatus among the plurality of base frequency blocks or of each of the plurality of base frequency blocks without error and NACK indicative of a state in which the mobile terminal apparatus detects an error, and a determining section configured to determine feedback control information on the downlink shared data channel signal of the particular base frequency block or of each of the plurality of base frequency blocks, based on the detected correlation value and a DTX determination threshold value.

According to this configuration, it is possible to detect the feedback control information (DTX and ACK/NACK information) from a received ACK/NACK signal received in uplink, using ACK/NACK candidate replicas associated with a downlink shared data channel signal of a particular base frequency block or for each of a plurality of base frequency blocks and DTX determination threshold value, and therefore, in the case of performing radio communications with a system band comprised of a plurality of base frequency blocks, it is possible to efficiently detect the feedback control information on downlink shared data channel signals transmitted with a plurality of base frequency blocks.

Technical Advantage of the Invention

According to the invention, it is possible to efficiently detect the feedback control information on downlink shared data channel signals transmitted with a plurality of base frequency blocks also in the case of performing radio communications with a system band comprised of a plurality of base frequency blocks.

DESCRIPTION OF EMBODIMENTS

As described above, for a signal of the downlink shared data channel (PDSCH) of a downlink CC, a retransmission response signal (ACK/NACK) that is feedback control information thereon is transmitted on the uplink control channel (PUCCH). The retransmission response signal is represented by Acknowledgement (ACK) indicating that the PDSCH is suitably received or Negative Acknowledgement (NACK) indicating that the PDSCH is not suitably received.

The radio base station apparatus is capable of detecting transmission success of the PDSCH by Acknowledgement (ACK) or that an error is detected on the PDSCH by Negative Acknowledgement (NACK). Further, the radio base station apparatus is capable of judging that transmission is DTX (Discontinuous Transmission) when reception power of radio resources allocated to a retransmission response signal is a predetermined value or less in uplink. DTX is a judgment result that "neither ACK nor NACK was notified from the mobile terminal apparatus", and this means that the mobile terminal apparatus was not able to receive the downlink control channel (PDCCH) or that the mobile terminal apparatus transmits the ACK/NACK signal but the radio base station apparatus cannot detect the signal due to poor propagation conditions and the like. In the former case, the mobile terminal apparatus does not detect that the PDSCH is transmitted to the mobile terminal apparatus, and as a result, transmits neither ACK nor NACK. Meanwhile, the radio base station apparatus transmits next new data when ACK is received, while performing retransmission control to retransmit transmitted data in the case of NACK or DTX state with no response.

Figure 1:
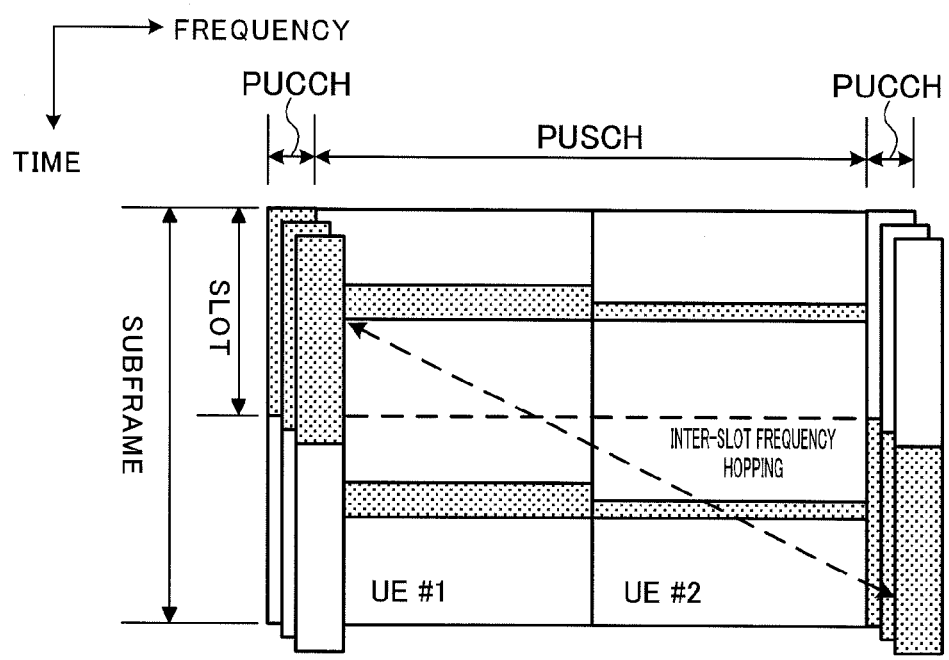
FIG. 1 is a diagram to explain a channel configuration with mapping of uplink signals.
Figure 2A:
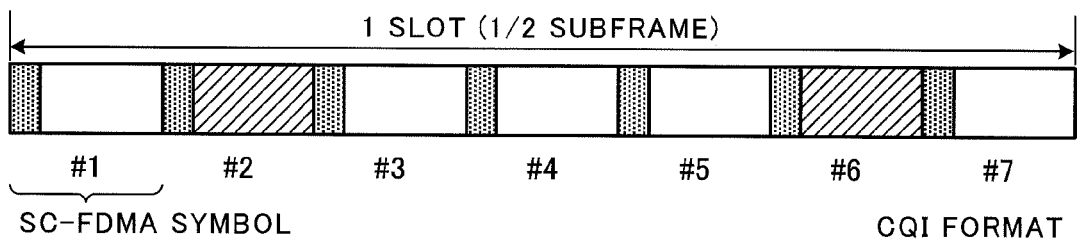
FIG. 2 contains diagrams illustrating physical uplink control channel formats.
Figure 2B:
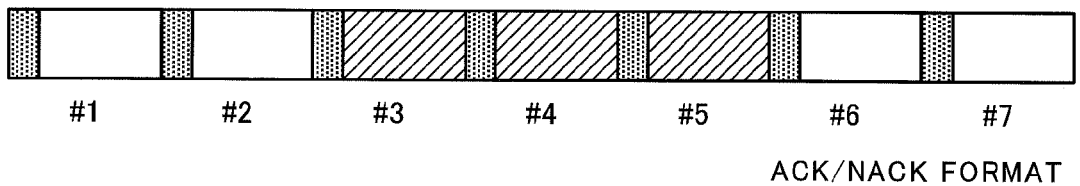
Figure 3:
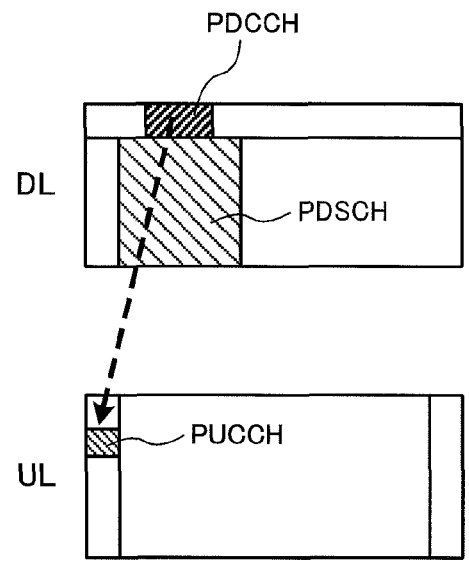
FIG. 3 is a schematic diagram to explain radio resources for a retransmission response signal in an LTE (Rel. 8) system.

In an LTE (Rel. 8) system, a mobile terminal apparatus is capable of obtaining radio resources for the PUCCH from parameters set by RRC signaling from the higher layer, and the control channel element (CCE) number (hereinafter, referred to as a "CCE index" as appropriate) of the downlink control channel (PDCCH) (see FIG. 3). For example, radio resources for the PUCCH include OCC (Orthogonal Cover), CS (Cyclic Shift) and RB (Resource Block) index. The control information (CQI, ACK/NACK) is multiplexed into thus obtained radio resources of the PUCCH according to the above-mentioned format, and is transmitted to the radio base station apparatus.

In the LTE (Rel. 8) system, as an ACK/NACK·DTX detection method in a radio base station apparatus, known are the separate detection method (hereinafter, referred to as "Separate Detection") for detecting ACK/NACK and DTX independently, and the joint detection method (hereinafter, referred to as "Joint Detection") for collectively detecting ACK/NACK and DTX.

In Separate Detection, first, reception signal power is measured using a reference signal (RS), and the reception power is compared with a beforehand defined DTX determination threshold value to determine DTX. In the case of non-DTX, channel estimation is performed using the reference signal (RS), and after frequency domain equalization, transmission ACK/NACK is detected by Maximum Likelihood Detection (MLD).

Meanwhile, in Joint Detection, first, correlation is obtained between a received ACK/NACK signal and each of beforehand prepared ACK/NACK candidate replicas. Then, DTX is determined by comparing the highest correlation value with a DTX determination threshold value. In the case of non-DTX, an ACK/NACK candidate replica used in calculation of the highest correlation value is detected as transmission ACK/NACK. In Joint Detection, as compared with Separate Detection, in addition to the reference signal (RS), the received ACK/NACK signal is also used, and therefore, it is possible to enhance detection accuracy of DTX and ACK/NACK. An example of arithmetic processing in Joint Detection will be shown below.

In Joint Detection, a reception signal in a kth subcarrier of a first OFDM symbol is obtained by (Eq. 1).

$$r^{(slot)}(l,k) = \sqrt{2S} h(l,k) d^{(slot)}(l) c^{(slot)}(l,k) + \eta^{(slot)}(l,k) \quad \text{(Eq. 1)}$$

Herein, "$\sqrt{2S}$" represents transmission power, "h" represents a channel component, and "$\eta$" represents a noise component. Further, "$d^{(slot)}(l)$" represents a transmission ACK/NAK symbol, and "$c^{(slot)}(l,k)$" represents a spreading code.

A reception ACK/NACK symbol ($\bar{r}^{(slot)}$) is obtained by performing the arithmetic processing by (Eq. 2) on the reception signal obtained by (Eq. 1). In addition, r-bar is shown as "$\bar{r}$" for convenience sake.

$$\bar{r}^{(slot)} = \sum_{k=0}^{N_{SC}^{RB}-1} \left[ \sum_{l=0}^{6} r^{(slot)}(l,k)\{w^{(slot)}(l)\}^* \right] \{c^{(slot)}(l,k)\}^* \quad \text{(Eq. 2)}$$

Herein, "$N_{SC}^{RB}$" represents the number of subcarriers per resource block (RB). Further, in (Eq. 2), the arithmetic processing inside the brackets of the right side represents block despreading processing, and the arithmetic processing of the entire right side represents cyclic shift division processing.

By performing the arithmetic processing by (Eq. 3) on the reception ACK/NACK signal obtained by (Eq. 2), it is possible to obtain transmission power (Power) of an ACK/NACK candidate replica that maximizes the correlation value with the reception ACK/NACK signal.

$$\text{Power} = \max_{\hat{d}^{(1)}, \hat{d}^{(2)} \in D} \left( \left| \sum_{l=0}^{6} \bar{r}^{(1)}\{\hat{d}^{(1)}\}^* \right|^2 + \left| \sum_{l=0}^{6} \bar{r}^{(2)}\{\hat{d}^{(2)}\}^* \right|^2 \right) \quad \text{(Eq. 3)}$$

Herein, "$\hat{d}^{(1)}$" and "$\hat{d}^{(2)}$" represent ACK/NACK candidate replicas. In addition, d-hat is shown as $\hat{d}$ for convenience sake.

In addition, ACK/NACK candidate replica $\hat{d}^{(slot)}$ is obtained by (Eq. 4).

$$\hat{d}^{(slot)} = \tilde{d}^{(slot)} \quad \text{(Eq. 4)}$$

Herein, "$\tilde{d}^{(slot)}$" is a symbol replica (more specifically, a symbol replica obtained by performing coding and modulation (BPSK or QPSK) on a beforehand determined ACK/NACK candidate bit) obtained from the ACK/NACK candidate bit corresponding to each kind of transmission ACK/NACK. In addition, d-tilde is shown as "$\tilde{d}$" for convenience.

In Joint Detection, the feedback control information (retransmission response signal) including transmission ACK/NACK ($\bar{d}^{(slot)}$) is obtained by determining transmission power (Power) of the ACK/NACK candidate replica obtained by (Eq. 3) based on (Eq. 5). In addition, d-bar is shown as "$\bar{d}$" for convenience sake.

$$\bar{d}^{(slot)} = \begin{cases} \hat{d}_{max}^{(slot)}, & \text{Power} \geq \text{threshold} \\ DTX, & \text{Power} < \text{threshold} \end{cases} \quad \text{(Eq. 5)}$$

Herein, "threshold" represents a beforehand defined DTX determination threshold value. In other words, when transmission power (Power) of the ACK/NACK candidate replica obtained in (Eq. 3) is the DTX determination threshold value "threshold" or more, ACK/NACK candidate replica $\hat{d}_{MAX}^{(slot)}$ with the maximum correlation value with the reception ACK/NACK signal is detected as transmission ACK/NACK ($\bar{d}^{(slot)}$). Meanwhile, when transmission power (Power) of the ACK/NACK candidate replica obtained in (Eq. 3) is less than the DTX determination threshold value "threshold", DTX is determined.

In addition, in LTE-A systems, for the purpose of further improving spectral efficiency, peak throughput and the like, assignment of frequencies with a wider band than in LTE is studied, and adopted is a configuration of a system band having a plurality of base frequency blocks (CCs) having a bandwidth that the LTE system is allowed to use. Therefore, it is conceived that retransmission response signals that are feedback control information on PDSCHs transmitted from a plurality of downlink CCs are also transmitted from a plurality of uplink CCs.

However, in uplink of LTE-A systems, application of SC-FDMA is studied as a radio access scheme. Therefore, in the retransmission response signals in response to data channels (PDSCHs) transmitted by a plurality of downlink CCs, in order to maintain characteristics of uplink single-carrier transmission, it is required to transmit only from a single CC. To cope with such a requirement, in LTE-A systems, it is studied that the mobile terminal apparatus generates a retransmission response signal of each CC based on the PDSCH for each of a plurality of CCs received from the radio base station apparatus, and maps the signal to the uplink control channel (PUCCH) of a user specific (UE-specific) CC to transmit.

Therefore, in LTE-A systems, studied is the PUCCH format (PUCCH format 3) in transmitting the feedback control information on PDSCHs transmitted with a plurality of downlink CCs. Herein, the PUCCH format 3 is generated by precoding on a DFT (Discrete Fourier Transform) base as in the PDSCH, and is characterized by multiplexing different mobile terminal apparatuses (UEs) by OCC (Orthogonal Cover Code). The mobile terminal apparatus is capable of obtaining radio resources of a retransmission response signal in this PUCCH format 3 using a field (hereinafter, referred to as an "ARI field") for an ARI (ACK/NACK Resource Indicator) provided on the downlink control channel (PDCCH). Herein, the ARI is identification information to designate radio resources for the retransmission response signal.

Figure 4:
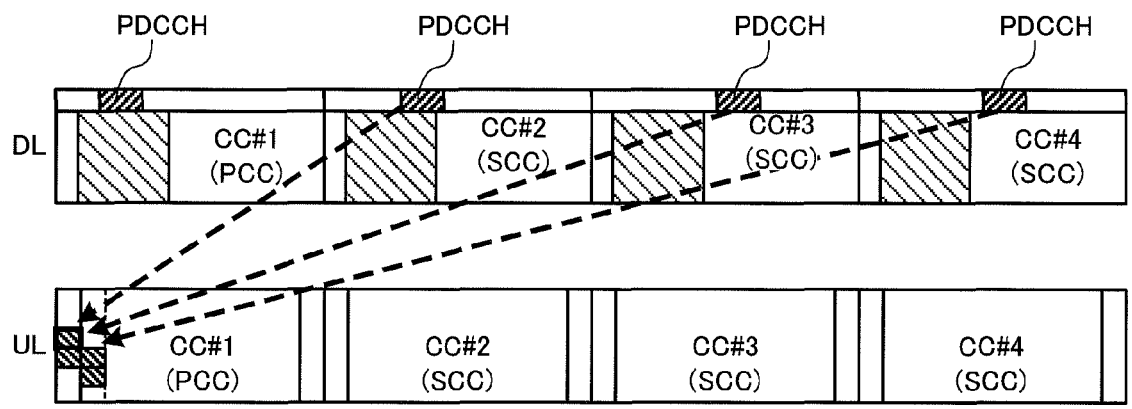
FIG. 4 is a schematic diagram to explain radio resources for retransmission response signals in an LTE-A system.

Hereinafter, described is an allocation method of radio resources for retransmission response signals in an LTE-A system FIG. 4 is a schematic diagram to explain radio resources for retransmission response signals in an LTE-A system. In addition, FIG. 4 shows the case that a transmission band is comprised of four CCs (CC#1 to CC#4). Further, FIG. 4 shows the case that the CC#1 forms a first base frequency block (PCC: Primary Component Carrier) of a mobile terminal apparatus targeted for transmission, and CC#2 to CC#4 form a second frequency block (SCC: Secondly Component Carrier).

In the LTE-A system, in the case of allocating radio resources for retransmission response signals, first, a plurality of (for example, 4) radio resources are allocated to each mobile terminal apparatus by RRC signaling from the higher layer. Further, on the PDCCH for the PDSCH of the SCC, the TPC command field (2 bits) is replaced with the ARI field. In the ARI field, among a plurality of radio resources allocated by RRC signaling, one radio resource for the mobile terminal apparatus to use is designated. In the mobile terminal apparatus, among a plurality of radio resources allocated by RRC signaling, by specifying the radio resource designated in the ARI field, it is possible to obtain the radio resource for the retransmission response signal. Then, it is studied to map the retransmission response signal based on the PDSCH for each of a plurality of received CCs to thus obtained radio resource to transmit.

In such a case of detecting the feedback control information based on the PUCCH format 3, it is necessary to decode not only radio resources designated by the ARI, but also radio resources (i.e. radio resources for the PUCCH in the LTE (Rel. 8) system) obtained from the CCE index of the PDCCH. This is because the feedback control information is multiplexed into the radio resources obtained from the CCE index of the PDCCH when the data channel (PDSCH) to the mobile terminal apparatus is assigned only to the PCC. The inventor of the present invention focused on the respect that it is necessary to efficiently detect the feedback control information multiplexed into a plurality of radio resources in the mobile communication system for performing radio communications using a system band comprised of a plurality of CCs, and arrived at the invention.

In other words, in a control information detection method according to the invention, detected is a correlation value between an ACK/NACK signal received in uplink and each of ACK/NACK candidate replicas associated with ACK indicative of a normal reception state of the PDSCH of a particular CC assigned to a mobile terminal apparatus or of each of a plurality of CCs among the plurality of CCs and NACK indicative of an abnormal reception state of the PDSCH, and feedback control information on the PDSCH of the particular CC or of each of the plurality of CCs is determined by comparing the detected correlation value with a DTX determination threshold value.

In a control information detection method according to a first aspect of the invention, beforehand prepared are ACK/NACK candidate replicas for the format 1 (for LTE (Rel. 8)) and ACK/NACK candidate replicas for the format 3. Then, obtained is a correlation value between an ACK/NACK signal received from a mobile terminal apparatus and each of all ACK/NACK candidate replicas (ACK/NACK candidate replicas for the format 1 and format 3). Then, the highest correlation value is compared with a DTX determination threshold value to determine DTX. Herein, the DTX determination threshold value may be set at a threshold value for each CC, or may be set at a common threshold value. Then, in the case of non-DTX, the ACK/NACK candidate replica used in calculation of the highest correlation value is detected as transmission ACK/NACK.

The detection method of feedback control information in Joint Detection (hereinafter, referred to as "Joint Detection related to the format 1" as appropriate) using ACK/NACK candidate replicas for the format 1 is performed by the arithmetic processing using above-mentioned (Eq. 1) to (Eq. 5). Therefore, the description thereof is omitted.

Described herein is the detection method of feedback control information in Joint Detection (hereinafter, referred to as "Joint Detection related to the format 3" as appropriate) using ACK/NACK candidate replicas for the format 3. Also in Joint Detection related to the format 3, a reception signal in a kth subcarrier of a first OFDM symbol is obtained by above-mentioned (Eq. 1).

In Joint Detection related to the format 3, a reception ACK/NACK symbol ($\tilde{r}^{(slot)}(k)$) subjected to block despreading is obtained by performing the arithmetic processing by (Eq. 6) on the reception signal obtained by (Eq. 1).

$$\tilde{r}^{(slot)}(k) = \sum_{l=0}^{6} r^{(slot)}(l,k)\{w^{(slot)}(l)\}^* \quad \text{(Eq. 6)}$$

Herein, the arithmetic processing of the entire right side of (Eq. 6) represents block despreading processing.

By performing the arithmetic processing by (Eq. 7) on the reception ACK/NACK signal obtained by (Eq. 6), it is possible to obtain transmission power (Power) of an ACK/NACK candidate replica that maximizes the correlation value with the reception ACK/NACK signal.

$$\text{Power} = \quad \text{(Eq. 7)}$$

-continued
$$\max_{\hat{d}^{(1)}(k),\hat{d}^{(2)}(k)\in D}\left(\left|\sum_{l=0}^{6}\tilde{r}^{(1)}(k)\{\hat{d}^{(1)}(k)\}^*\right|^2 + \left|\sum_{l=0}^{6}\tilde{r}^{(2)}(k)\{\hat{d}^{(2)}(k)\}^*\right|^2\right)$$

Herein, "$\hat{d}^{(1)}$" and "$\hat{d}^{(2)}$" represent ACK/NACK candidate replicas.

In addition, ACK/NACK candidate replica $\hat{d}^{(slot)}(k)$ in Joint Detection related to the format 3 is obtained by (Eq. 8).

$$\hat{d}^{(slot)}(k) = \sum_{m=0}^{12}\tilde{d}^{(slot)}(m)\exp\left(-j\frac{2\pi km}{12}\right) \quad \text{(Eq. 8)}$$

Herein, (Eq. 8) indicates the DFT arithmetic processing necessary in ACK/NACK candidate replica generation.

In Joint Detection related to the format 3, the feedback control information including transmission ACK/NACK ($\bar{d}^{(slot)}(k)$) is obtained by determining transmission power (Power) of the ACK/NACK candidate replica obtained by (Eq. 7) based on (Eq. 9).

$$\bar{d}^{(slot)}(k) = \begin{cases} \hat{d}_{max}^{(slot)}(k), & \text{Power} \geq \text{threshold} \\ DTX, & \text{Power} < \text{threshold} \end{cases} \quad \text{(Eq. 9)}$$

Herein, "threshold" represents a beforehand defined DTX determination threshold value. In other words, when transmission power (Power) of the ACK/NACK candidate replica obtained in (Eq. 7) is the DTX determination threshold value "threshold" or more, ACK/NACK candidate replica $\hat{d}_{MAX}^{(slot)}(k)$ with the maximum correlation value with the reception ACK/NACK signal is detected as transmission ACK/NACK ($\bar{d}^{(slot)}(k)$). Meanwhile, when transmission power (Power) of the ACK/NACK candidate replica obtained in (Eq. 7) is less than the DTX determination threshold value "threshold", DTX is determined.

In the control information detection method according to the first aspect, Joint Detection related to the format 1 and Joint Detection related to the format 3 is performed in parallel on a reception ACK/NACK signal received in uplink. Then, the correlation value of higher correlation between both the highest correlation values is compared with the DTX determination threshold value, and DTX is determined. Then, in the case of non-DTX, the ACK/NACK candidate replica used in calculation of the highest correlation value is detected as transmission ACK/NACK.

According to the control information detection method according to the first aspect, it is possible to detect DTX and transmission ACK/NACK from the reception ACK/NACK signal received in uplink using beforehand defined ACK/NACK candidate replicas for the format 1 and format 3 and DXT determination threshold value, and therefore, also in the case of performing radio communications with the system band comprised of a plurality of CCs, it is possible to efficiently detect the feedback control information on PDSCHs transmitted with a plurality of CCs.

In a control information detection method according to a second aspect of the invention, DTX and transmission ACK/NACK is detected from a reception signal received in uplink, using one of ACK/NACK candidate replicas for the format 1 and format 3 and DTX determination threshold values (for example, ACK/NACK candidate replicas for the format 3 and DTX determination threshold value). Then, when necessary, DTX and transmission ACK/NACK is detected using the other one of ACK/NACK candidate replicas for the format 1 and format 3 and DTX determination threshold values (for example, ACK/NACK candidate replicas for the format 1 and DTX determination threshold value).

Figure 5:
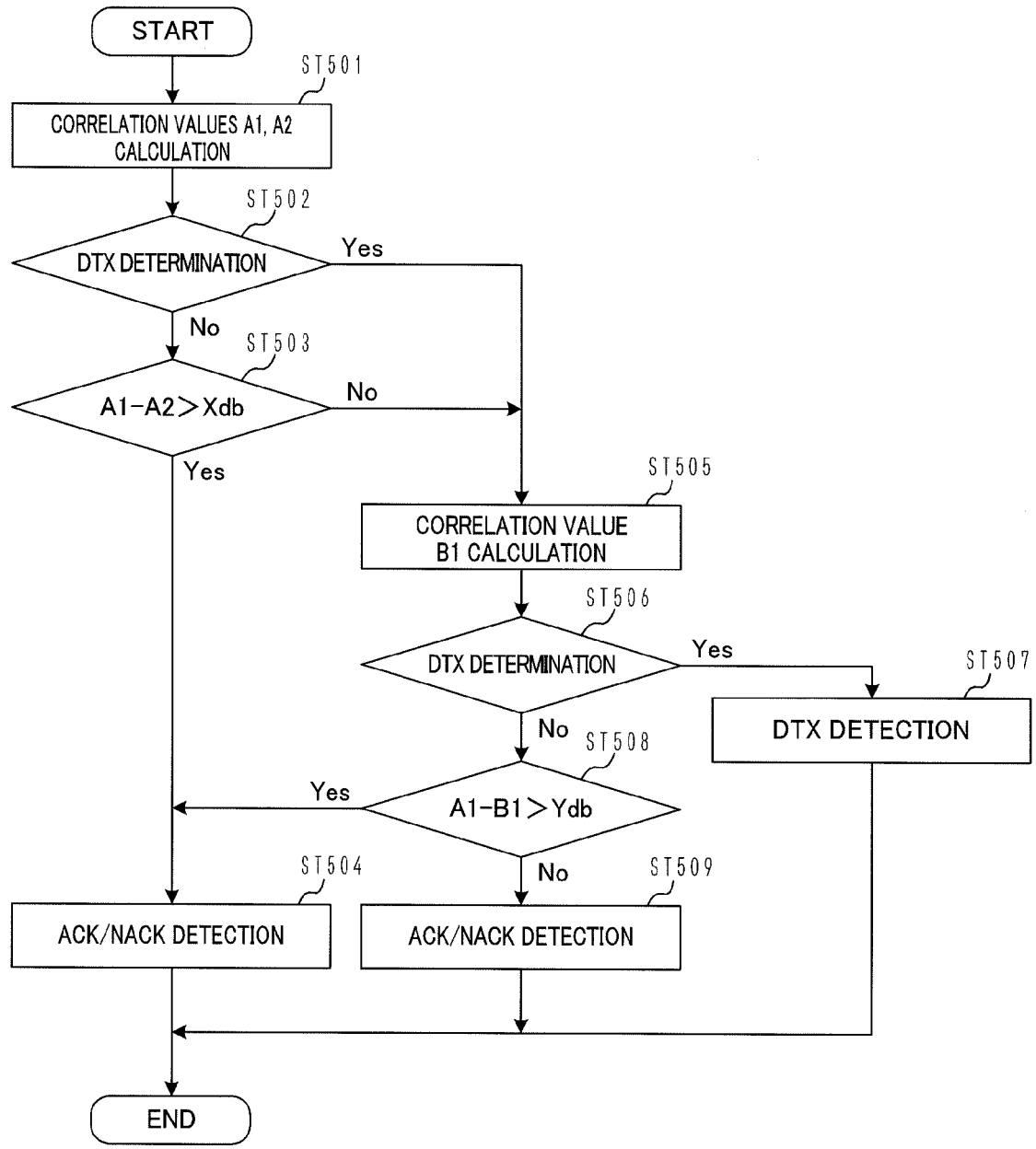
FIG. 5 is a flow diagram to explain an example of a control information detection method according to a second aspect of the invention.

Herein, in the control information detection method according to the second aspect, described is an example of the method of detecting the feedback control information transmitted from the mobile terminal apparatus. FIG. 5 is a flow diagram to explain an example of the control information detection method according to the second aspect of the invention. Shown herein is the case that DTX and transmission ACK/NACK is detected using ACK/NACK candidate replicas for the format 3 and DTX determination threshold value, and that when necessary, DTX and transmission ACK/NACK is detected using ACK/NACK candidate replicas for the format 1 and DTX determination threshold value. In addition, the order thereof may be reversed.

In the control information detection method according to the second aspect, obtained first is correlation between a reception signal received in uplink and each of the ACK/NACK candidate replicas for the format 3 to calculate a highest correlation value A1 and second highest correlation value A2 (step ST501). Then, the correlation value A1 is compared with the DTX determination threshold value to determine DTX (step ST502).

Herein, in the case of non-DTX (step ST502; No), it is determined whether a difference in the power value between the correlation value A1 and the correlation value A2 is more than a predetermined value (herein, X db) (step ST503). When the difference in the power value between the correlation value A1 and the correlation value A2 is more than the predetermined value (step ST503; Yes), the ACK/NACK candidate replica used in calculation of the correlation value A1 is detected as transmission ACK/NACK (step ST504). Then, detection of the feedback control information transmitted from the mobile terminal apparatus is finished. In this case, the detection processing of DTX and transmission ACK/NACK is not performed using the ACK/NACK candidate replicas for the format 1 and DTX determination threshold value.

Meanwhile, in the case of DTX (step ST502; Yes) or in the case that the difference in the power value between the correlation value A1 and the correlation value A2 is the predetermined value or less (step ST503; No), obtained is correlation between the reception signal received in uplink and each of the ACK/NACK candidate replicas for the format 1 to calculate a highest correlation value B1 (step ST505). Then, the correlation value B1 is compared with the DTX determination threshold value to determine DTX (step ST506).

Herein, in the case of DTX (step ST506; Yes), it is detected that the feedback control information from the mobile terminal apparatus is DTX (step ST507). Then, detection of the feedback control information transmitted from the mobile terminal apparatus is finished.

In contrast thereto, in the case of non-DTX (step ST506; No), it is determined whether a difference in the power value between the correlation value A1 and the correlation value B1 is more than a predetermined value (herein, Y db) (step ST508). When the difference in the power value between the correlation value A1 and the correlation value B1 is more than the predetermined value (step ST508; Yes), the ACK/NACK candidate replica used in calculation of the correlation value A1 is detected as transmission ACK/NACK (step ST504). Meanwhile, when the difference in the power value between the correlation value A1 and the correlation value B1 is the predetermined value or less (step ST508; NO), the ACK/NACK candidate replica used in calculation of the correlation value B1 is detected as transmission ACK/NACK (step ST509). Then, detection of the feedback control information transmitted from the mobile terminal apparatus is finished.

According to the control information detection method according to the second aspect, it is possible to detect DTX and transmission ACK/NACK from the reception ACK/NACK signal received in uplink using beforehand defined ACK/NACK candidate replicas for the format 1 and format 3 and DXT determination threshold values, and therefore, also in the case of performing radio communications with the system band comprised of a plurality of CCs, it is possible to efficiently detect the feedback control information on PDSCHs transmitted with a plurality of CCs. Particularly, when transmission ACK/NACK is detected in the first-performed detection processing using the ACK/NACK candidate replicas for one of the formats and DTX determination threshold value, it is possible to omit the detection processing using the ACK/NACK candidate replicas for the other one of the formats and DTX determination threshold value, and it is thereby possible to reduce the arithmetic processing amount in the radio base station apparatus.

Described below are configurations of the mobile terminal apparatus, radio base station apparatus and the like to which are applied control information detection methods according to the invention. Described herein is the case of using a radio base station apparatus and mobile terminal apparatuses that support LTE-A scheme systems (LTE-A systems).

Figure 6:
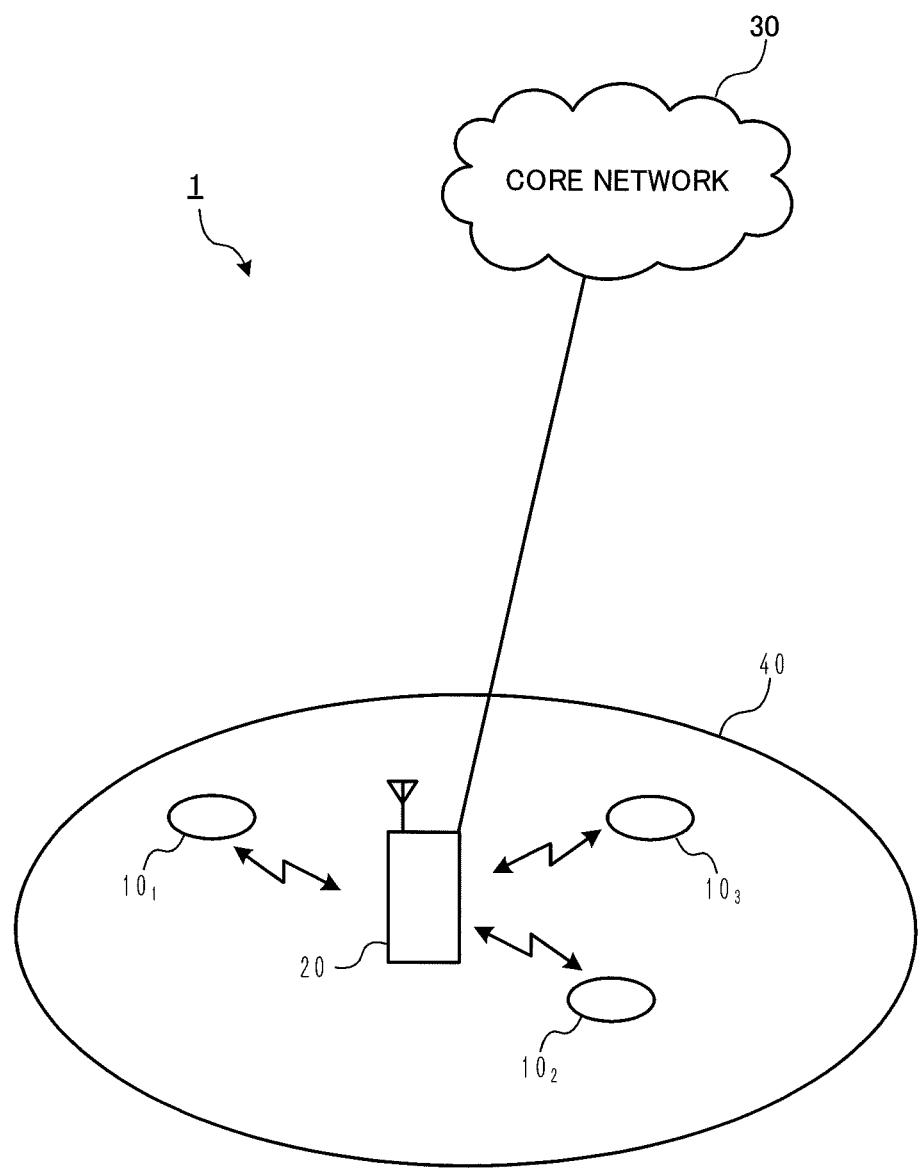
FIG. 6 is a diagram to explain a configuration of a mobile communication system having mobile terminal apparatuses and radio base station apparatus according to one Embodiment of the invention.

With reference to FIG. 6, described first is a mobile communication system having mobile terminal apparatuses and radio base station apparatus to which are applied control information detection methods according to the invention. FIG. 6 is a diagram to explain a configuration of a mobile communication system 1 having mobile terminal apparatuses 10 and radio base station apparatus 20 according to one Embodiment of the invention. In addition, the mobile communication system 1 as shown in FIG. 6 is a system including the LTE system, for example. Further, the mobile communication system 1 may be called IMT-Advanced or may be called 4G.

As shown in FIG. 6, the mobile communication system 1 includes the radio base station apparatus 20 and a plurality of mobile terminal apparatuses 10 ($10_1$, $10_2$, $10_3$, . . . , $10_n$, n is an integer where n>0) that communicate with the radio base station apparatus 20 and is comprised thereof. The radio base station apparatus 20 is connected to a core network 30. The mobile terminal apparatuses 10 communicate with the radio base station apparatus 20 in a cell 40. In addition, for example, the core network 30 includes an access gateway apparatus, radio network controller (RNC), mobility management entity (MME), etc., but is not limited thereto.

In the mobile communication system 1, as a radio access scheme, OFDMA is applied in downlink, and SC-FDMA is applied in uplink. Herein, OFDMA is a multi-carrier transmission scheme for dividing a frequency band into narrow frequency bands (subcarriers), and mapping data to each subcarrier to perform communications. SC-FDMA is a single-carrier transmission scheme for mapping data to contiguous bands for each terminal to perform communications, and actualizes multi-access by a plurality of terminals using mutually different bands.

Described herein are communication channels in LTE systems. In downlink, used are the PDSCH for transmitting traffic data of each mobile terminal apparatus 10, PDCCH for notifying each mobile terminal apparatus 10 of L1/L2 control information such as allocation information of resource blocks (RBs) on the PDSCH, data modulation scheme·channel coding rate and retransmission related information, and the like. Further, reference signals used in channel estimation, reception quality measurement, etc. are transmitted together with the channels.

In uplink, used are the PUSCH for transmitting traffic data of each mobile terminal apparatus 10, PUCCH for transmitting L1/L2 control information such as channel quality information (CQI) report for downlink frequency scheduling and ACK/NACK in response to downlink transmission data, and the like. Further, demodulation reference signals used in channel estimation and channel quality measurement reference signals used in channel quality measurement are transmitted together with the channels.

Figure 7:
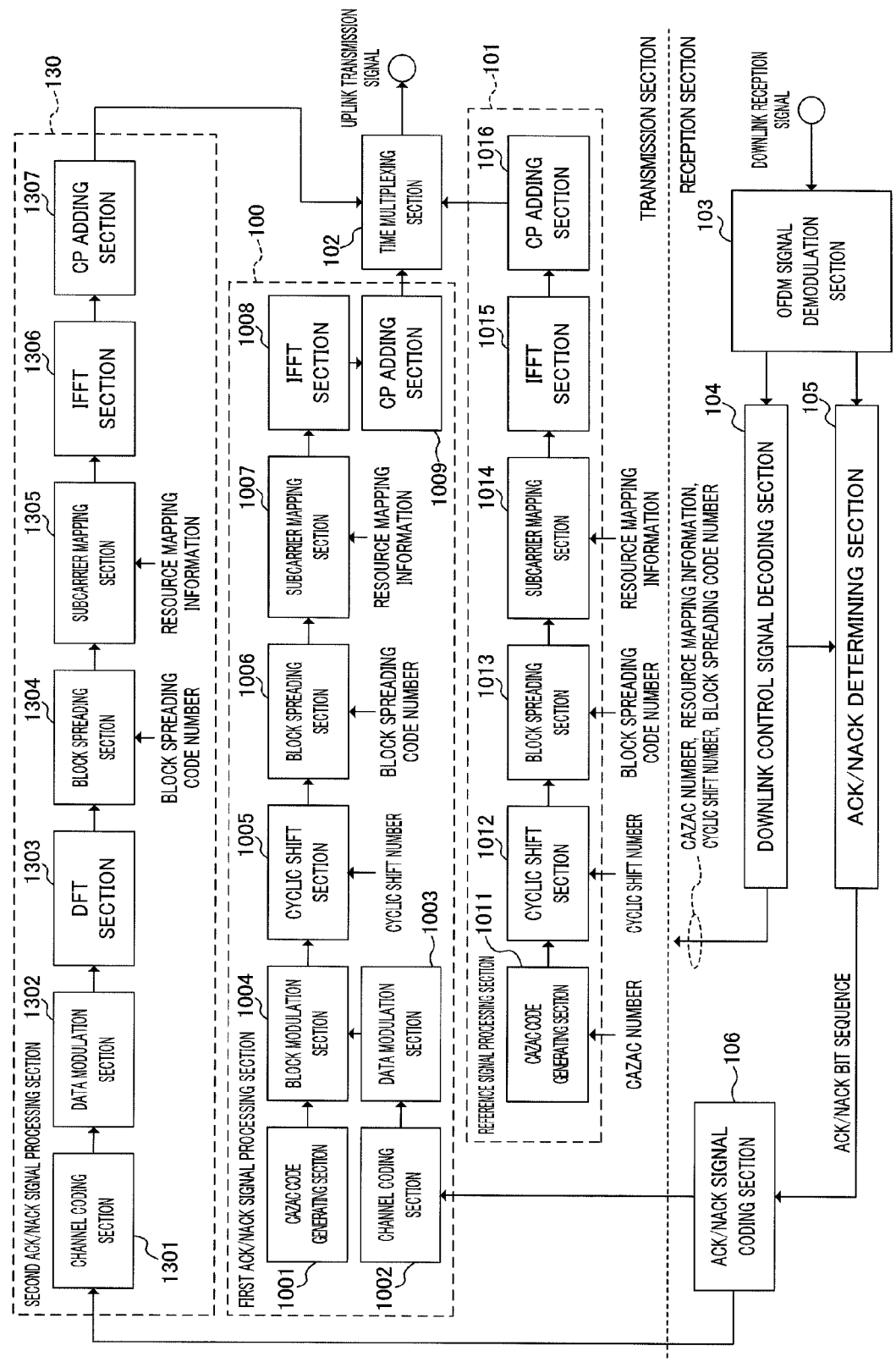
FIG. 7 is a diagram illustrating a schematic configuration of the mobile terminal apparatus according to the Embodiment.

FIG. 7 is a diagram illustrating a schematic configuration of the mobile terminal apparatus 10 according to this Embodiment. The mobile terminal apparatus 10 as shown in FIG. 7 is provided with a transmission section and a reception section. The transmission section is provided with a first ACK/NACK signal processing section 100, second ACK/NACK signal processing section 130, reference signal processing section 101, and time multiplexing section 102 that time-multiplexes the ACK/NACK signal and reference signal. In addition, processing blocks to transmit user data (PUSCH) are not shown in functional blocks of the transmission section in the figure, but the user data (PUSCH) is multiplexed in the time multiplexing section 102.

The first ACK/NACK signal processing section 100 is a portion that performs processing required to transmit a retransmission response signal according to the PUCCH format 1 (1a, 1b) defined in the LTE (Rel. 8) system. The second ACK/NACK signal processing section 130 is a portion that performs processing required to transmit retransmission response signals according to the PUCCH format 3 defined in the LTE-A system.

The first ACK/NACK signal processing section 100 has a CAZAC code generating section 1001 that generates a CAZAC code sequence associated with the CAZAC number, a channel coding section 1002 that performs error correcting coding on an ACK/NACK bit sequence, a data modulation section 1003 that performs data modulation, a block modulation section 1004 that block-modulates the generated CAZAC code sequence with the data-modulated signal, a cyclic shift section 1005 that cyclically shifts the block-modulated signal, a block spreading section 1006 that block-spreads the cyclically-shifted signal with a block spreading code (multiplies by an orthogonal code), a subcarrier mapping section 1007 that maps the block-spread signal to subcarriers, an IFFT section 1008 that performs Inverse Fast Fourier Transform (IFFT) on the mapped signal, and a CP (Cyclic Prefix) adding section 1009 that adds a CP to the IFFT-processed signal.

The second ACK/NACK signal processing section 130 has a channel coding section 1301 that performs error correcting coding on an ACK/NACK bit sequence, a data modulation section 1302 that performs data modulation on the ACK/NACK bit sequence, a DFT (Discrete Fourier Transform) section 1303 that performs DFT on the data-modulated signal, a block spreading section 1304 that block-spreads the DFT-processed signal with a block spreading code, a subcarrier mapping section 1305 that maps the block-spread signal to subcarriers, an IFFT section 1306 that performs IFFT on the mapped signal, and a CP adding section 1307 that adds a CP to the IFFT-processed signal.

The reference signal processing section 101 has a CAZAC code generating section 1011 that generates a CAZAC code sequence associated with the CAZAC number, a cyclic shift section 1012 that cyclically shifts the reference signal comprised of the CAZAC code sequence, a block spreading section 1013 that block-spreads the cyclically-shifted signal with a block spreading code, a subcarrier mapping section 1014 that maps the block-spread signal to subcarriers, an IFFT section 1015 that performs IFFT on the mapped signal, and a CP adding section 1016 that adds a CP to the IFFT-processed signal.

In addition, uplink reference signals include SRS (Sounding RS) and RS. The SRS is a reference signal for the radio base station apparatus 20 to estimate a state of an uplink channel of each mobile terminal apparatus 10 required for scheduling (and timing control), and is multiplexed into the last SC-FDMA symbol of the second slot independently of the PUSCH and PUCCH. Meanwhile, the RS is multiplexed into the second symbol and sixth symbol of each slot.

The mobile terminal apparatus 10 determines ACK/NACK on a signal received on the downlink shared data channel (PDSCH), and generates an ACK/NACK bit sequence in response to the determination. The generated ACK/NACK bit sequence is coded based on a beforehand defined coding table, and then, is output to the first ACK/NACK signal processing section 100 or the second ACK/NACK signal processing section 130.

The data modulation section 1003 of the first ACK/NACK signal processing section 100 modulates the ACK/NACK bit sequence subjected to channel coding in the channel coding section 1002 into a signal of polar coordinate component. The data modulation section 1003 outputs the data-modulated signal to the block modulation section 1004. The CAZAC code generating section 1001 prepares a CAZAC code sequence associated with the CAZAC number assigned to the user. The CAZAC code generating section 1001 outputs the generated CAZAC code sequence to the block modulation section 1004. The block modulation section 1004 block-modulates the CAZAC code sequence with the data-modulated control signal for each time block corresponding to one SC-FDMA symbol. The block modulation section 1004 outputs the block-modulated signal to the cyclic shift section 1005.

The cyclic shift section 1005 cyclically shifts the signal in the time domain by a predetermined cyclic shift amount. In addition, the cyclic shift amount varies with each user, and is associated with the cyclic shift number. The cyclic shift section 1005 outputs the cyclically-shifted signal to the block spreading section 1006. The block spreading section 1006 multiplies (block-spreads) the cyclically-shifted reference signal by an orthogonal code (OCC: Orthogonal Cover Code). The block spreading section 1006 outputs the block-spread signal to the subcarrier mapping section 1007.

The subcarrier mapping section 1007 maps the block-spread signal to subcarriers based on resource mapping information. The subcarrier mapping section 1007 outputs the mapped signal to the IFFT section 1008. The IFFT section 1008 performs IFFT on the mapped signal to transform into a signal in the time domain. The IFFT section 1008 outputs the IFFT-processed signal to the CP adding section 1009. The CP adding section 1009 adds a CP to the mapped signal. The CP adding section 1009 outputs the CP-added signal to the time multiplexing section 102.

The data modulation section 1302 of the second ACK/NACK signal processing section 130 modulates an ACK/NACK bit sequence subjected to channel coding in the channel coding section 1301 into a signal of polar coordinate component. The data modulation section 1302 outputs the data-modulated signal to the DFT section 1303. The DFT section 1303 performs DFT on the data-modulated signal to transform into a signal in the frequency domain. The DFT section 1303 outputs the DFT-processed signal to the block-spreading section 1304. The block spreading section 1304 multiplies the DFT-processed signal by the orthogonal code (OCC). The block-spreading section 1304 outputs the block-spread signal to the subcarrier mapping section 1305.

The subcarrier mapping section 1305 maps the block-spread signal to subcarriers based on resource mapping information. The subcarrier mapping section 1305 outputs the mapped signal to the IFFT section 1306. The IFFT section 1306 performs IFFT on the mapped signal to transform into a signal in the time domain. The IFFT section 1306 outputs the IFFT-processed signal to the CP adding section 1307. The CP adding section 1307 adds a CP to the mapped signal. The CP adding section 1307 outputs the CP-added signal to the time multiplexing section 102.

The CAZAC code generating section 1011 of the reference signal processing section 101 prepares a CAZAC code sequence associated with the CAZAC number assigned to the user, and uses as a reference signal. The CAZAC code generating section 1011 outputs the reference signal to the cyclic shift section 1012. The cyclic shift section 1012 cyclically shifts the reference signal in the time domain by a predetermined cyclic shift amount. In addition, the cyclic shift amount varies with each user, and is associated with the cyclic shift number. The cyclic shift section 1012 outputs the cyclically-shifted reference signal to the block spreading section 1013.

The block spreading section 1013 multiplies the cyclically-shifted reference signal by an orthogonal code (OCC: Orthogonal Cover Code). Herein, the OCC (block spreading code number) used in the reference signal may be notified from the higher layer by RRC signaling or the like, or the OCC beforehand associated with CS (Cyclic Shift) of data symbol may be used. The block spreading section 1013 outputs the block-spread signal to the subcarrier mapping section 1014.

The subcarrier mapping section 1014 maps the signal in the frequency domain to subcarriers based on resource mapping information. The subcarrier mapping section 1014 outputs the mapped reference signal to the IFFT section 1015. The IFFT section 1015 performs IFFT on the mapped signal to transform into a reference signal in the time domain. The IFFT section 1015 outputs the IFFT-processed reference signal to the CP adding section 1016. The CP adding section 1016 adds a CP to the reference signal multiplied by the orthogonal code. The CP adding section 1016 outputs the CP-added reference signal to the time multiplexing section 102.

The time multiplexing section 102 time-multiplexes the uplink control signal from the first ACK/NACK signal processing section 100 or the second ACK/NACK signal processing section 130 and the reference signal from the reference signal processing section 101 to be a transmission signal including the uplink control channel signal. Thus generated transmission signal is transmitted to the radio base station apparatus 20 in uplink.

The reception section has an OFDM signal demodulation section 103 that demodulates an OFDM signal, a downlink control signal decoding section 104 that decodes a downlink control signal to determine radio resources for a retransmission response signal, an ACK/NACK determining section 105 that determines ACK/NACK from a downlink signal, and an ACK/NACK signal coding section 106.

The OFDM signal demodulation section 103 receives a downlink OFDM signal to demodulate. In other words, the section 103 removes the CP from the downlink OFDM signal, performs Fast Fourier Transform, extracts subcarriers assigned the BCH signal or downlink control signal, and performs data demodulation. The OFDM signal demodulation section 103 outputs the data-demodulated signal to the downlink control signal decoding section 104. Further, the OFDM signal demodulation section 103 outputs the downlink signal to the ACK/NACK determining section 105.

The downlink control signal decoding section 104 decodes the data-demodulated signal, and determines radio resources for the retransmission response signal allocated to the apparatus. More specifically, the downlink control signal decoding section 104 decodes the data-demodulated signal, and as radio resources, obtains the CAZAC number, resource mapping information (including the RB index and ARI), the cyclic shift number, and the block spreading code number. The downlink control signal decoding section 104 outputs these radio resources to the ACK/NACK determining section 105.

The ACK/NACK determining section 105 determines whether or not the received downlink shared channel (PDSCH) is received without error, and outputs each state of ACK when the PDSCH is received without error, NACK when an error is detected, and DTX when the PDSCH is not detected to the ACK/NACK signal coding section 106 as a determination result (ACK/NACK bit sequence). When a plurality of CCs is assigned to communications with the radio base station apparatus 20, the section 105 determines whether or not the PDSCH is received without error for each CC.

The ACK/NACK signal coding section 106 codes the determination result (ACK/NACK bit sequence) by the ACK/NACK determining section 105, based on a beforehand defined coding table. Further, the ACK/NACK signal coding section 106 outputs the coded ACK/NACK bit sequence to the channel coding section 1002 or channel coding section 1301 of the transmission section.

Figure 8:
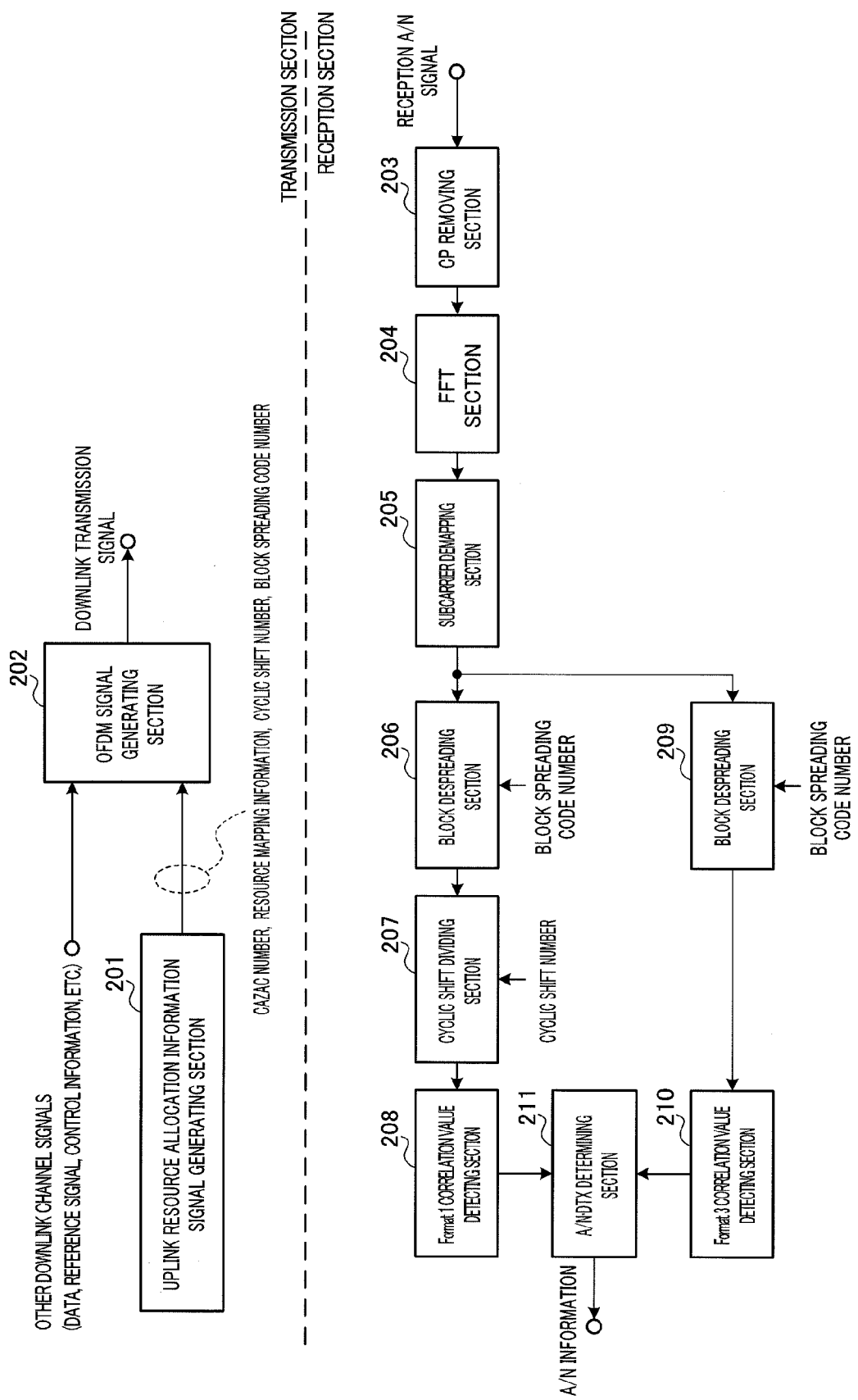
FIG. 8 is a diagram illustrating a configuration of the radio base station apparatus according to the Embodiment.

FIG. 8 is a diagram illustrating a schematic configuration of the radio base station apparatus 20 according to this Embodiment. In addition, FIG. 8 shows the configuration of the radio base station apparatus 20 to which is applied the above-mentioned control information detection method according to the first aspect. The radio base station apparatus 20 as shown in FIG. 8 is provided with a transmission section and a reception section. The transmission section has an uplink resource allocation information signal generating section 201, and an OFDM signal generating section 202 that multiplexes other downlink channel signals and uplink resource allocation information signal to generate an OFDM signal. Herein, the other downlink channel signals include data, reference signal, control signal, etc.

The uplink resource allocation information signal generating section 201 generates the uplink resource allocation information signal including the CAZAC number, resource mapping information (including RB index and ARI), the cyclic shift number and the block spreading code number (OCC number). The uplink resource allocation information signal generating section 201 outputs the generated uplink resource allocation information signal to the OFDM signal generating section 202.

The OFDM signal generating section 202 maps the downlink signal including the other downlink channel signals and uplink resource allocation information signal to subcarriers, performs Inverse Fast Fourier Transform (IFFT), adds a CP, and thereby generates a downlink transmission signal. Thus generated downlink transmission signal is transmitted to the mobile terminal apparatus 10 in downlink.

The reception section has a CP removing section 203 that removes the CP from a reception signal, an FFT section 204 that performs Fast Fourier Transform (FFT) on the reception signal, a subcarrier demapping section 205 that demaps the FFT-processed signal, a block despreading section 206 that despreads the subcarrier-demapped signal by a block spreading code (OCC), a cyclic shift dividing section 207 that cancels the cyclic shift from the despread signal to divide into a signal of a targeted user, and a Format 1 correlation value detecting section 208 that detects a correlation value between the user-divided demapped signal and each of ACK/NACK candidate replicas for the format 1.

Further, the reception section has a block despreading section 209 that despreads the subcarrier-demapped signal by the block spreading code (OCC), a Format 3 correlation value detecting section 210 that detects a correlation value between the despread signal and each of ACK/NACK candidate replicas for the format 3, and an A/N (ACK/NACK)·DTX determining section 211 that determines transmission ACK/NACK and DTX based on the correlation values from the Format 1 correlation value detecting section 208 and Format 3 correlation value detecting section 210. In addition, processing blocks to receive user data (PUSCH) are not shown in functional blocks of the reception section in the figure, but the user data (PUSCH) is demodulated and decoded in a data demodulation section and data decoding section, not shown.

The CP removing section 203 removes a portion corresponding to the CP and extracts an effective signal portion. The CP removing section 203 outputs the CP-removed signal to the FFT section 204. The FFT section 204 performs FFT on the reception signal to transform into a signal in the frequency domain. The FFT section 204 outputs the FFT-processed signal to the subcarrier demapping section 205. The subcarrier demapping section 205 extracts an ACK/NACK signal that is an uplink control channel signal from the signal in the frequency domain using the resource mapping information. The subcarrier demapping section 205 outputs the extracted ACK/NACK signal to the block despreading sections 206 and 209.

The block despreading sections 206 and 209 despread the reception signal subjected to block spreading i.e. orthogonal multiplexing using the orthogonal code (OCC) (block spreading code), using the orthogonal code used in the mobile terminal apparatus. The block despreading section 206 outputs the despread signal to the cyclic shift dividing section 207. The block despreading section 209 outputs the despread signal to the Format 3 correction value detecting section 210. The cyclic shift dividing section 207 divides the control signal subjected to orthogonal multiplexing using the cyclic shift, using the cyclic shift number. The uplink control channel signal from the mobile terminal apparatus 10 is cyclically shifted with a different cyclic shift amount for each user. Accordingly, by cyclically shifting in the opposite direction by the same cyclic shift amount as the cyclic shift amount performed in the mobile terminal apparatus 10, it is possible to isolate the control signal of the user targeted for the reception processing. The cyclic shift dividing section 207 outputs the signal subjected to user division to the Format 1 correlation value detecting section 208.

The Format 1 correlation value detecting section 208 obtains correlation with the user-divided signal (reception ACK/NACK signal) using beforehand defined ACK/NACK candidate replicas for the format 1, and detects the highest correlation value. More specifically, the section 208 obtains the correlation value between the reception ACK/NACK signal corresponding to resources associated with the CCE index of the PDCCH in a particular CC (PCC) assigned to the user and each of the ACK/NACK candidate replicas for the format 1, and detects the highest correlation value. The Format 1 correlation value detecting section 208 outputs the detected correlation value to the A/N·DTX determining section 211.

The Format 3 correlation value detecting section 210 obtains correlation with the user-divided signal (reception ACK/NACK signal) using beforehand defined ACK/NACK candidate replicas for the format 3, and detects the highest correlation value. More specifically, the section 210 obtains the correlation value between the reception ACK/NACK signal corresponding to resources designated in the ARI of the PDCCH in the SCC and each of the ACK/NACK candidate replicas for the format 3, and detects the highest correlation value. The Format 3 correlation value detecting section 210 outputs the detected correlation value to the A/N·DTX determining section 211.

The A/N·DTX determining section 211 compares the correlation values output from the Format 1 correlation value detecting section 208 and the Format 3 correlation value detecting section 210, and specifies the highest correlation value. Then, the section 211 compares the correlation value with the beforehand defined DTX determination threshold value, and determines DTX or ACK/NACK. More specifically, when the highest correlation value is smaller than the DTX determination threshold value, the A/N·DTX determining section 211 determines DTX. Meanwhile, when the highest correlation value is larger than the DTX determination threshold value, the A/N·DTX determining section 211 determines the ACK/NACK candidate replica used in calculation of the highest correlation value as transmission ACK/NACK. The A/N·DTX determining section 211 outputs determined DTX or transmission ACK/NACK as the ACK/NACK information.

In the radio base station apparatus 20 as shown in FIG. 8, the ACK/NACK signal extracted in the subcarrier demapping section 205 is despread parallel in the block despreading sections 206 and 209. The signal despread in the block despreading section 206 is divided into signals for each user in the cyclic shift dividing section 207, and then, is output to the Format 1 correlation value detecting section 208. Meanwhile, the signal despread in the block despreading section 209 is output to the Format 3 correlation value detecting section 210. The Format correlation value detecting section 208 and Format 3 correlation value detecting section 210 detect correlation values of highest correlation with the reception ACK/NACK signal to output to the A/N·DTX determining section 211. Based on these correlation values, the A/N·DTX determining section 211 determines DTX or transmission ACK/NACK, and outputs the determination result as the ACK/NACK information.

Thus, in the radio base station apparatus 20 (the radio base station apparatus 20 to which is applied the control information detection method according to the first aspect) according to this Embodiment, it is possible to detect DTX and transmission ACK/NACK from the reception ACK/NACK received in uplink using beforehand defined ACK/NACK candidate replicas for the format 1 and format 3 and DXT determination threshold value, and therefore, also in the case of performing radio communications with the system band comprised of a plurality of CCs, it is possible to efficiently detect the feedback control information on PDSCHs transmitted with a plurality of CCs.

Figure 9:
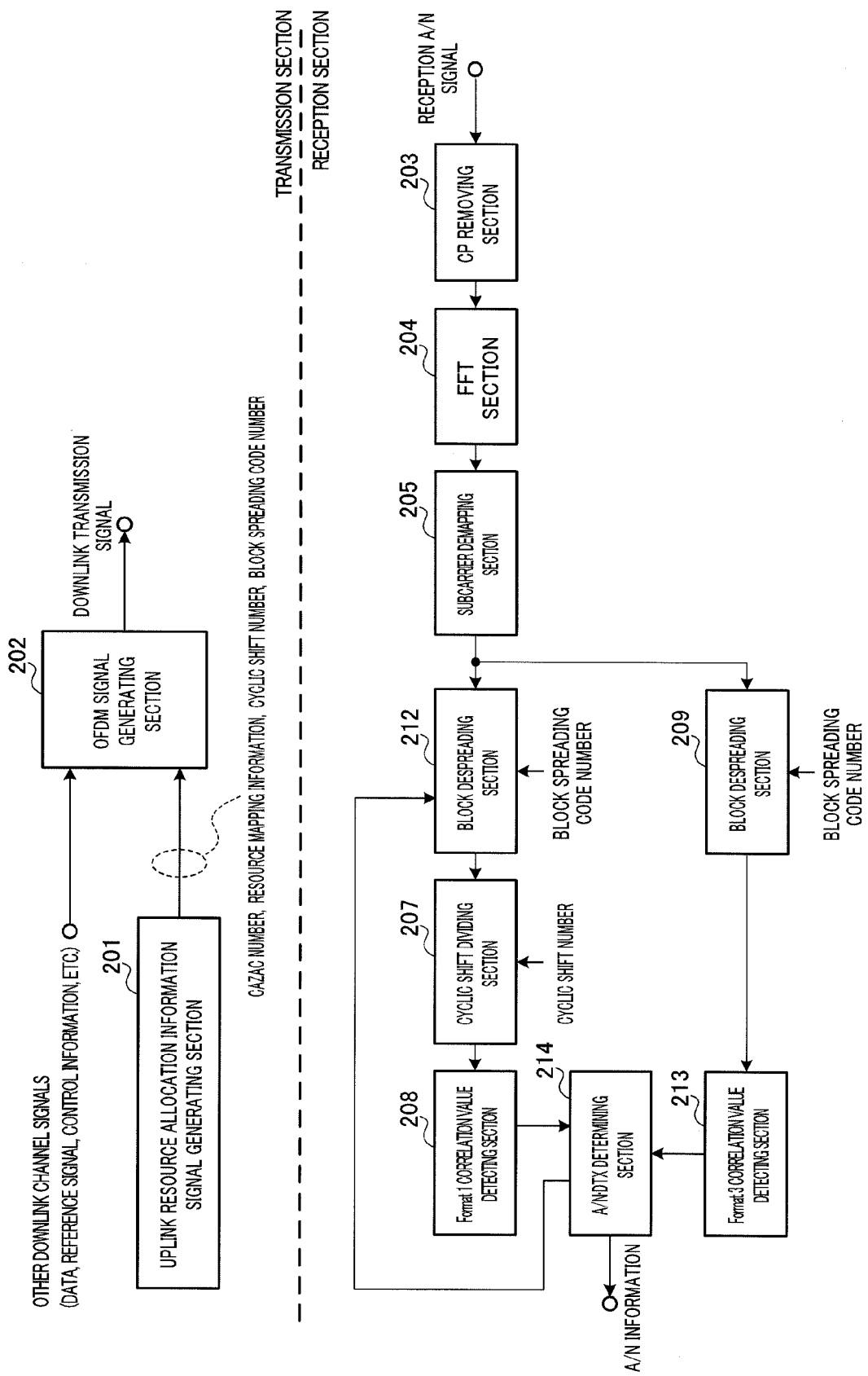
FIG. 9 is a diagram illustrating another configuration of the radio base station apparatus according to the Embodiment.

FIG. 9 is a diagram illustrating a schematic configuration of the radio base station apparatus 20 according to this Embodiment. In addition, FIG. 9 shows the configuration of the radio base station apparatus 20 to which is applied the above-mentioned control information detection method according to the second aspect. Shown herein is the configuration of the radio base station apparatus 20 which detects DTX and transmission ACK/NACK using the ACK/NACK candidate replicas for the format 3 and DTX determination threshold value, and when necessary, detects DTX and transmission ACK/NACK using the ACK/NACK candidate replicas for the format 1 and DTX determination threshold value.

In addition, in the radio base station apparatus 20 as shown in FIG. 9, components common to the radio base station apparatus 20 as shown in FIG. 8 are assigned the same reference numerals to omit descriptions thereof. The radio base station apparatus 20 as shown in FIG. 9 differs from the radio base station apparatus 20 as shown in FIG. 8 in the respect of having a block spreading section 212, Format 3 correlation value detecting section 213 and A/N·DTX determining section 214.

Using reception of a signal (despreading instruction signal) from the A/N·DTX determining section 214 as a trigger, the block despreading section 212 despreads the ACK/NACK signal from the subcarrier demapping section 205 using the orthogonal code used in the mobile terminal apparatus, and in this respect, differs from the block despreading section 206 as shown in FIG. 8.

The Format 3 correlation value detecting section 213 detects the correlation value (correlation value A2 as described above) of second highest correlation in addition to the correlation value (correlation value A1 as described above) of highest correlation with the user-divided signal (reception ACK/NACK signal) using beforehand defined ACK/NACK candidate replicas for the format 3, and in this respect, differs from the Format 3 correlation value detecting section 210.

The A/N·DTX determining section 214 detects DTX and transmission ACK/NACK using the ACK/NACK candidate replicas for the format 3 and DTX determination threshold value, while when necessary, detecting DTX and transmission ACK/NACK using the ACK/NACK candidate replicas for the format 1 and DTX determination threshold value, and in this respect, differs from the A/N·DTX determining section 211.

More specifically, the section 214 compares the highest correlation value output from the Format 3 correlation value detecting section 213 with the beforehand defined DTX determination threshold value to determine DTX, while determining transmission ACK/NACK based on a difference between the highest correlation value (above-mentioned correlation value A1) and the second highest correlation value (above-mentioned correlation value A2). In the case that DTX is determined or in the case that the difference between the highest correlation value and the second highest correlation value is a predetermined value or less, the section 214 outputs a despreading instruction signal to the block despreading section 212. Then, the section 214 compares the highest correlation value (above-mentioned correlation value B1) output from the Format 1 correlation value detecting section 208 with the beforehand defined DTX determination threshold value to determine DTX, while determining transmission ACK/NACK based on a difference between the highest correlation value from the Format 3 correlation value detecting section 213 and the highest correlation value from the Format 1 correlation value detecting section 208.

In the radio base station apparatus 20 as shown in FIG. 9, the ACK/NACK signal extracted in the subcarrier demapping section 205 is first despread in the block despreading section 209. The despread signal is output to the Format 3 correlation value detecting section 213. The Format 3 correlation value detecting section 213 detects the correlation value of highest correlation with the reception ACK/NACK signal and the correlation value of second highest correlation to output to the A/N·DTX determining section 214. The A/N·DTX determining section 214 determines DTX or transmission ACK/NACK based on these correlation values. In the predetermined case (the case where the difference between the correlation value of highest correlation with the reception ACK/NACK signal and the correlation value of second highest correlation does not reach the predetermined value, etc.), the despreading instruction signal is output to the block despreading section 212. By this means, the ACK/NACK signal extracted in the subcarrier demapping section 205 is despread in the block despreading section 212. The despread signal is divided into signals for each user in the cyclic shift dividing section 207, and then, is output to the Format 1 correlation value detecting section 208. The Format 1 correlation value detecting section 208 detects the correlation value of highest correlation with the reception ACK/NACK signal to output to the A/N·DTX determining section 214. Based on the correlation value, the A/N·DTX determining section 214 determines DTX or transmission ACK/NACK, and outputs the determination result as the ACK/NACK information.

Thus, in the radio base station apparatus 20 (the radio base station apparatus 20 to which is applied the control information detection method according to the second aspect) according to this Embodiment, it is possible to detect DTX and transmission ACK/NACK from the reception ACK/NACK signal received in uplink using beforehand defined ACK/NACK candidate replicas for the format 1 and format 3 and DXT determination threshold values, and therefore, also in the case of performing radio communications with the system band comprised of a plurality of CCs, it is possible to efficiently detect the feedback control information on PDSCHs transmitted with a plurality of CCs. Particularly, when transmission ACK/NACK is detected in the first-performed detection processing using the ACK/NACK candidate replicas for one of the formats and DTX determination threshold value, it is possible to omit the detection processing using the ACK/NACK candidate replicas for the other one of the formats and DTX determination threshold value, and it is thereby possible to reduce the arithmetic processing amount in the radio base station apparatus.

Without departing from the scope of the present invention, the number of processing sections and processing procedures in the above-mentioned descriptions are capable of being carried into practice with modifications thereof as appropriate. Further, each element shown in the figures represents the function, and each functional block may be actualized by hardware or may be actualized by software. Moreover, the invention is capable of being carried into practice with modifications thereof as appropriate without departing from the scope of the invention.

The above-mentioned Embodiment describes the control information detection methods according to the invention, using the aspect of beforehand preparing ACK/NACK candidate replicas for the format 1 and ACK/NACK candidate replicas for the format 3, obtaining correlation values of the ACK/NACK candidate replicas with the ACK/NACK signal received in uplink, and based on the correlation values, determining the feedback control information, as a specific example. However, the aspect to which is applied the control information detection method according to the invention is not limited thereto, and is capable of being modified as appropriate.

In addition to the above-mentioned format 3, studied is the method (hereinafter, referred to as "channel selection" for convenience in description) of using a plurality of radio resources of the format 1b when the number of bits of ACK/

NACK is relatively low. In the channel selection, the radio base station apparatus and mobile terminal apparatus share a mapping table that defines feedback control information (retransmission response signal) associated with the position of radio resources.

The control information detection method according to the invention is also applicable to such channel selection. In other words, the radio base station apparatus prepares ACK/NACK candidate replicas in association with the feedback control information in the above-mentioned mapping table to detect correlation values with the ACK/NACK signal received from the mobile terminal apparatus. Then, the apparatus compares the detected correlation value with the DTX determination threshold value to determine the feedback control information on the PDSCH of a particular CC or each of a plurality of CCs, and is thereby capable of efficiently detecting the feedback control information on PDSCHs transmitted with a plurality of CCs also in the case of performing radio communications using channel selection in a system band comprised of a plurality of CCs.

The present application is based on Japanese Patent Application No. 2010-264082 filed on Nov. 26, 2010, entire content of which is expressly incorporated by reference herein.

The invention claimed is:

1. A radio base station apparatus for performing radio communications with a system band comprised of a plurality of base frequency blocks, comprising:
   a detecting section having a first correlation value detecting section that detects a correlation value between an ACK/NACK signal received in uplink and each of ACK/NACK candidate replicas associated with a particular base frequency block assigned to the mobile terminal apparatus among the plurality of base frequency blocks, and a second correlation value detecting section that detects a correlation value between the ACK/NACK signal received in uplink and each of ACK/NACK candidate replicas associated with the plurality of base frequency blocks; and
   a determining section that determines feedback control information on a downlink shared data channel signal of the particular base frequency block or of each of the plurality of base frequency blocks, based on the detected correlation value and a DTX determination threshold value.

2. The radio base station apparatus according to claim 1, wherein the detecting section parallel performs detection of correlation values by the first and second correlation value detecting sections, and based on the highest correlation value among correlation values detected in the first and second correlation value detecting sections, and the DTX determination threshold value, the determining section determines feedback control information on the downlink shared data channel signal of the particular base frequency block or of each of the plurality of base frequency blocks.

3. The radio base station apparatus according to claim 2, wherein the determining section determines whether or not the feedback control information is DTX with a result of comparison between the highest correlation value and the DTX determination threshold value, and when the feedback control information is not DTX, detects an ACK/NACK candidate replica used in detection of the highest correlation value as ACK/NACK information.

4. The radio base station apparatus according to claim 1, wherein the detecting section first performs detection of correlation values by one of the first and second correlation value detecting sections, and corresponding to a determination result of feedback control information in the determining section based on the detected correlation values and the DTX determination threshold value, performs detection of correlation values by the other one of the first and second correlation value detecting sections.

5. The radio base station apparatus according to claim 4, wherein the determining section determines whether or not the feedback control information is DTX with a result of compression between the correlation value detected by one of the first and second correlation value detecting sections and the DTX determination threshold value, and in a case that the feedback control information is not DTX and that a difference between the highest correlation value and the second highest correlation value is a certain value or more, detects an ACK/NACK candidate replica used in detection of the highest correlation value as ACK/NACK information.

6. The radio base station apparatus according to claim 5, wherein in a case that the feedback control information is DTX, the determining section determines whether or not the feedback control information is DTX with a result of compression between the correlation value detected by the other one of the first and second correlation value detecting sections and the DTX determination threshold value, and in a case that the feedback control information is not DTX, detects an ACK/NACK candidate replica used in detection of the highest correlation value detected by one of the first and second correlation value detecting sections or an ACK/NACK candidate replica used in detection of the highest correlation value detected by the other one of the first and second correlation value detecting sections as ACK/NACK information.

7. A control information detection method in a radio base station apparatus for performing radio communications with a system band comprised of a plurality of base frequency blocks, comprising:
   detecting a first correlation value between an ACK/NACK signal received in uplink and each of ACK/NACK candidate replicas associated with a particular base frequency block assigned to the mobile terminal apparatus among the plurality of base frequency blocks, and a second correlation value between the ACK/NACK signal received in uplink and each of ACK/NACK candidate replicas associated with the plurality of base frequency blocks; and
   determining feedback control information on a downlink shared data channel signal of the particular base frequency block or of each of the plurality of base frequency blocks, based on the detected correlation value and a DTX determination threshold value.

8. The control information detection method according to claim 7, wherein performed parallel is detection of correlation values using ACK/NACK candidate replicas associated with the particular base frequency block, and detection of correlation values using ACK/NACK candidate replicas associated with the plurality of base frequency blocks, and based on the highest correlation value among the detected correlation values and the DTX determination threshold value, feedback control information is determined on the downlink shared data channel signal of the particular base frequency block or of each of the plurality of base frequency blocks.

9. The control information detection method according to claim 7, wherein performed first is one of detection of correlation values using ACK/NACK candidate replicas associated with the particular base frequency block, and detection of correlation values using ACK/NACK candidate replicas associated with the plurality of base frequency blocks, the other one of detection of correlation values using ACK/NACK candidate replicas associated with the particular base frequency block, and detection of correlation values using ACK/

NACK candidate replicas associated with the plurality of base frequency blocks is performed corresponding to a determination result of the feedback control information based on the detected correlation values and the DTX determination threshold value, and based on the detected correlation values and the DTX determination threshold, the feedback control information is determined.

* * * * *